Aug. 11, 1959   G. H. HARMON ET AL   2,899,141
IMPEDANCE CALIBRATOR
Filed April 18, 1956   2 Sheets-Sheet 1

INVENTORS
G. H. HARMON
A. E. ROCKWOOD, JR.
BY
W. C. Parnell
ATTORNEY

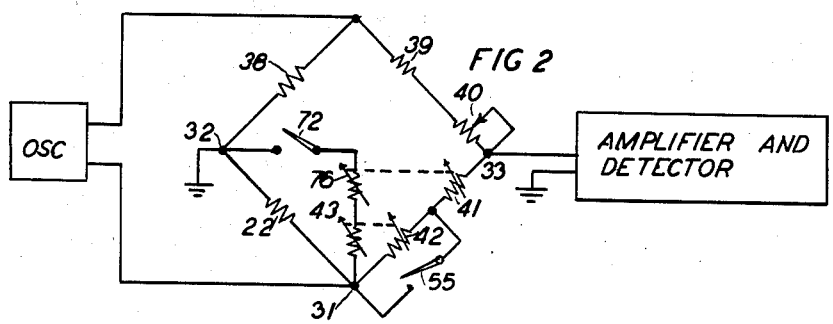

FIG 2

FIG 3
NORMAL OPER. SEQ.
STEP NUMBER
1. • BALANCE, DET. ENERGIZED
2. ✕ RY 11
3. ✕ RY 12
4. ✕ RY 13 UNBALANCES BRIDGE
5. ⸺ "SLOW" DET CIRCUIT
6. SOL. RY 11
7. ⸺ RY 12
8. ✕ RY 14
9. ✕ RY 15 ⸺ SLOW SOL.
10. ✕ RY 16
11. ✕ RY 17
12. ⸺ DET CIRCUIT
13. • BAL. DET ENERGIZED
14. ✕ RY 11
15. ✕ RY 12
16. ✕ RY 18
17. ✕ CUTTER SOL  ✕ FAST SOL.
18. ✕ END OF CY. SW.
19. ✕ RY 21
20. ⸺ DET CIRCUIT
21. ⸺ RY 11
22. ⸺ RY 12
23. ⸺ RY 13   ⸺ RY 18
24. ⸺ DET. RY 14   ⸺ CUTTER SOL  ⸺ FAST SOL
25. CIRCUIT ⸺ RY 15   ⸺ END OF CY. SW.
26. ⸺ RY 16   ⸺ RY 21
27. ⸺ RY 17

FIG 4
SET-UP SEQ.
STEP NUMBER
1. ✕ CHECK SWITCH
2. ✕ RY 13 SHORTS OUT RES 42  ✕ RY 19
3. ⸺ DET CIRCUIT  ✕ RY 14 SLOW SOL.  ✕ MOTOR 77
4. ✕ RY 15 SLOW SOL.  ✕ ZERO SW.
5. ✕ RY 16   ✕ RY 20 ZERO SW.
6. ✕ RY 17   RESISTOR 76 ADDED TO BRIDGE
7. ⸺ DET. CI.
8. • BAL DET  ENERGIZED
9. ✕ RY 11
10. ✕ RY 12
11. ✕ RY 18
12. ✕ FAST CUTTER  RY 19  RY 20  MOTOR 77
    SOL  SOL
13-22

STEPS 13 THROUGH 22
ARE IDENTICAL TO STEPS
18 THROUGH 27 OF FIG. 3

✕ SHORTS OUT RESISTOR 42

LEGEND
✕ RELAY OR SOLENOID
OPERATES OR CIRCUIT CLOSED
⸺ RELAY OR SOLENOID
RELEASES OR CIRCUIT OPENED
• BRIDGE IS DRIVEN TO
"BALANCE" CONDITION

INVENTORS
G. H. HARMON
A. E. ROCKWOOD, JR.
BY
W.C. Parnell
ATTORNEY

United States Patent Office 2,899,141
Patented Aug. 11, 1959

2,899,141

IMPEDANCE CALIBRATOR

George H. Harmon, Kingston, N.H., and Albert E. Rockwood, Jr., North Andover, Mass., assignors to Western Electric Company, Incorporated, New York, N.Y., a corporation of New York Application April 18, 1956, Serial No. 578,917

7 Claims. (Cl. 242—9)

This invention relates to an impedance calibrator and has for its object the automatic calibration of wire wound impedance elements to prescribed values.

In accordance with this object, a wire wound impedance element, having an excessive number of turns for the impedance desired, is progressively unwound while the remaining, progressively changing, unwound portion of the element is electrically connected in an impedance bridge. The impedance of the unwound portion is compared to a standard, and when the exact predetermined value is reached, a cutter responsive to the bridge output is actuated to cut the wire.

According to an important feature of the invention, the bridge detector and associated control circuit are actuated at an "off-null" condition of the bridge where the rate of change of the bridge output or unbalance voltage is substantially constant in order to give maximum sensitivity and reproducibility of results.

These and other features of the invention will be more readily understood from the following detailed description taken in conjunction with the accompanying drawing, in which:

Fig. 1 is a schematic diagram of a calibrator incorporating the features of the invention and particularly adapted for calibrating wire wound resistance elements;

Fig. 2 is a simplified schematic diagram of the bridge portion of Fig. 1; and

Figs. 3 and 4 are charts showing operating sequences of the calibrator.

In general, the calibrator includes A.C. and D.C. power supplies 5 and 6, respectively, a four terminal impedance bridge 7, an oscillator 8 for the input to the bridge, an amplifier and detector 9 for the output of the bridge, control relays 11 through 21 inclusive, and associated "reset," "check," and "speed control" switches 2, 3 and 4, respectively, a device 10 for progressively stripping and making electrical contact to the wire of a resistance element 22 being calibrated, and a solenoid 23 for operating a cutter 35 which shears the resistance wire against a fixed anvil member 36.

One way of fabricating wire wound resistance elements involves first overwinding them with more than the number of turns required for the prescribed resistance value and then trimming the wire to give the prescribed value. In the automatic apparatus of this invention, the resistance wire is unwound from the element 22 while the unwound portion of the element is connected into the unknown resistance arm of the bridge (between terminal 31 and the ground terminal 32). A device which may be used for progressively stripping insulation from resistance wire and for making electrical contact thereto is disclosed in the co-pending application of E. T. Stocker, Serial No. 577,238, filed April 10, 1956. This device utilizes a pair of opposing insulation crushing and electrical contacting rollers 24 between which the resistance wire is passed as it pays off an element being calibrated. The rollers 24 of this stripper, which are electrically connected to ground potential (terminal 32 of the bridge) are driven by a motor 34 through a two-speed clutch 25 so that the stripping and progressive electrical contacting of the wire may be accomplished at either a fast or slow rate. The clutch of this device is operated by an air cylinder 29 which is controlled by solenoids 26 and 27 to run the rollers either fast or slow, respectively. The cutter contolled by solenoid 23 may be of conventional design and is mounted on the insulation stripper to clip the wire as it is fed from between the rollers.

The basic parts of the bridge circuit are the ratio arm resistors 38 and 39, the standard resistance arm resistor 41 and the unknown resistance arm for the resistor 22 being calibrated. The other elements of the bridge are for setting the bridge up and for compensation purposes. Since the amplifier-detector is operated at an "off-null" condition in order to give maximum sensitivity, elements of different resistance for calibration require different bridge constants to permit operation of the amplifier-detector at the same "off-null" condition. The variable resistor 40 in series with the ratio arm resistor 39 is provided for setting the bridge for this "off-null" bridge condition. The resistor 43 is inserted in the bridge during the setup thereof in order to compensate for the difference between measurement point (i.e., where the rollers make contact with resistance wire) and the cutting point of the element under calibration. The resistor 42 is inserted in the standard resistance arm of the bridge to allow changing the roller speed as the resistance of the element 22 approaches the prescribed value. The relay 13, by operating, shorts out the inserted resistor 42 as the prescribed resistance "$R_x$" is approached by the changing element 22 to create a more unbalanced condition of the bridge and allow the calibration to be continued at the slower speed until the exact value, as determined by the setting of the standard resistor 41, is reached.

The amplifier-detector 9 converts the output of the bridge to a negative D.C. voltage and applies this voltage to the grid of the gas tube 46, which is biased to keep it from firing or conducting until the bridge reaches the prescribed "off-null" condition, which may be considered the balance condition for this bridge.

The operation of relays 11 through 21 will be discussed in connection with the calibration of an element which follows. Once the adjustable components of the bridge have been set up for a particular impedance value "$R_x$" for an element to be calibrated (this set-up operation will be described below), the power switch 44 is closed to connect the A.C. supply to the oscillator 8 for the bridge and the rectifier 6 for the relays. Next, switch 45 of drive motor 34 to the rollers is closed and the rollers are driven until the impedance of the element 22 reaches a prescribed "off-null" value, at which time the output signal across terminals 33 and 32 of the bridge are sufficient to actuate or fire the gas tube 46 of the detector which, in turn, energizes relay 11. The subsequent step-by-step sequence of operation of the various components of the calibrator are shown in Fig. 3. When relay 11 operates, it sets up the control conditions of the other relays 12 through 21. The control functions of these relays include the changing of the roller speeds (by means of solenoids 26 and 27); the changing of the bridge balance condition (by means of resistor 42); the operation of the cutter (by means of energizing solenoid 23) and the resetting of the circuit. On operating, contacts 50 of relay 11 close the energizing circuit for relay 12, which in turn operates to close an energizing circuit for relay 13 through its operated contacts 51 and the "reset" switch 2. Relay 13 in turn, on operating, opens the detector output circuit by the operation of its contact 56 and also closes the energizing circuit for the "slow"

solenoid 27 which operates to slow down the rollers which are initially driven at the higher speed. Operated contacts 55 of relay 13 also short out resistor 42 in the standard arm of the bridge to further unbalance the bridge to permit the amplifier-detector 9 to recognize a second balance condition. On opening the detector circuit, relay 13 also causes relay 11 to be de-energized which, when released, releases relay 12. Released contacts 51 of relay 12 close the energizing circuit, through the operated contacts 54 of relay 13, for relay 14. When relay 14 operates, its operated contact 61 opens the energizing circuit for the "slow" solenoid 27 to prepare the clutch 25 for a change to the fast speed when solenoid 26 is subsequently energized. Operated contacts 58 of relay 14 close the energizing circuit for relay 15, in addition, the operated contact 62 thereof closes the energizing circuit for relay 16 the operated contact 63 thereof closes the energizing circuit for relay 17, which operates to reconnect the output circuit of the detector through its contact 64. Relays 15, 16 and 17 operate in succession and provide a time delay which is required to insure that the detector gas tube circuit has been inactivated so that it will properly respond to the next balanced condition. The rollers 24, which are being driven at their slow speed, continue to reduce the impedance of the element 22 until the output of the bridge is again at the "off-null" condition required for firing or actuating the amplifier-detector 9. When the detector is again energized, relay 11 is again operated through the operated contacts 64 of relay 17 and the release contact 74 of relay 21. The operation of relay 11 thereupon operates relay 12 to close the energizing circuit for relay 18 through operated contacts 52 thereof and the operated contact 60 of relay 14. When relay 18 operates, contacts 66 close to energize the cutter solenoid 23 which thereupon operates to clip the wire to the desired "$R_x$" resistance. Contact 68 of relay 18, on operating, closes the energizing circuit for the "fast" solenoid 26, which speeds up the rollers 24, which feeds the clipped end of the resistance wire through them in preparation for the calibration of the next resistance element. The cutter solenoid, on operating, closes an "end of cycle" switch 75 which, on closing, completes the energizing circuit for the "reset" relay 21. Operated contacts 74 of relay 21 open the detector circuit which in turn de-energizes relays 11 and 12. The combination of the operated contacts 73 of relay 21 and the released contacts 51 of relay 12 causes relays 13 and 18 to release, which in turn release all relays, solenoids and switches previously operated and reconnects the output circuit of the amplifier-detector 9. The "reset" operation may also be initiated manually by actuating switch 2 which removes the ground from contact 51 of relay 12, while adding a ground to relay 18, which starts the series of operations starting from step 16 of Fig. 3 to completion.

In setting up the bridge for calibration of a resistance "$R_x$" resistors 41 and 76 (which simulates an element 22 in the unknown arm) are set to "$R_x$" ohms and resistors 42 and 43 set to particular values depending on the gage and resistivity of the wire of the element 22 to be calibrated. The resistor 43 is set to a value equal to the resistance of the wire between the rollers and the cutter since the cutter is interposed between the element 22 and the rollers. The resistor 42 is selected to provide an unbalance bridge condition of sufficient magnitude, after it is shorted out by the operation of relay 13, to permit the completion of the relay operation as included between steps 5 and 12 of Fig. 3, before the "off-null" balance condition for actuating the amplifier-detector is reached by the rollers. To simplify the set-up operation, resistor 41 may be ganged to 76 and resistor 42 ganged to 43. As mentioned above, resistor 40 must be set at a different value for each value of "$R_x$" being calibrated, since the detector is biased to operate at a prescribed bridge output. In addition, since the operation of the calibrator is a progressive or dynamic one, the resistance of this element should be set dynamically, that is, simulating the actual calibrating operation. For this purpose, the contactor of the resistor 40 is driven by a slow speed motor 77 to approximate the roller contacting rate.

The resistance of resistor 40 is set automatically by closing the "check" switch 3, which starts the step-by-step sequence shown in Fig. 4. The "check" switch closes the energizing circuit for relays 13 and 19, which operate to short out resistor 42 (operated contacts 55); open the detector output circuit (operated contacts 56); close the energizing circuit for relay 14 (through operated contacts 54); and close the energizing circuit for the "slow" solenoid 27 (through operated contacts 57) to drive the rollers at slow speed. When relay 14 operates, contacts 61 open the energizing circuit for the "slow" solenoid 27 and the operated contacts 58 close the energizing circuit for relay 15 which, in turn, operates to successively operate relays 16 and 17. When contacts 64 of relay 17 are operated, they re-establish the detector output circuit for a subsequent balancing of the bridge. When relay 19 operates on the actuation of the "check" switch, it locks up through its operated contact 69. The release contacts 65 of relay 18 and the operated contacts 70 of relay 19 close the energizing circuit for motor 77 to drive the variable resistor 40, which is a 360 degree variable resistor, until its maximum resistance is reached. At this point of maximum resistance, a zero switch 47, which is also driven by motor 77, closes the energizing circuit for relay 20, which operates to insert the resistor 76 (and compensating resistor 43) across terminals 31 and 32 of the bridge. As the detector circuit has already been closed by the operation of relay 17, motor 77 continues driving variable resistor 40 until the voltage across the output of the bridge reaches the prescribed value to actuate the detector, at which time relays 11, 12 and 18 will be successively operated. The operation of relay 18 opens the motor energizing circuit (operated contacts 67) to fix the value of resistor 40. The motor 77 is a slow speed, fast stop motor of conventional design so that it will not overdrive the resistor 40. Operated contacts 68 of relay 18 close the circuit to energize the "fast" solenoid 26, operated contacts 66 close the circuit for the cutter solenoid 23, and operated contact 65 opens the energizing circuit for relay 19. From this step on, the step-by-step operation is similar to the steps 17 through 27 of the normal operating sequence as shown in Fig. 3.

The speed control switch 4 is a two decked switch for locking the rollers 24 in either "fast" or "slow" speed or in its normal two speed operation as described above. For example, if accuracy of calibration is not critical, the "fast" solenoid may be locked in the circuit by switching to the "fast" position which locks relays 13, 14, 15, 16 and 17 operated without operating the "slow" solenoid 27. If, on the other hand, extreme accuracy in calibration is desired, the switch may be placed in its "slow" position, which operates relay 13 and locks the circuit in condition with the rollers at slow speed.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In a wire wound impedance element calibrator, means for progressively making electrical contact with wire being unwound from an overwound element to be calibrated, a two-speed driver for the electrical contacting means, a cutter for clipping the impedance element wire being unwound, an impedance bridge having means for connecting therein the unwound portion of an element being calibrated for comparing the impedance thereof with a standard, means for initially operating the two-speed driver at its higher speed, means responsive to a predetermined off-null condition of the bridge to reduce the speed of the driver to its lower speed, and means responsive to the output signal of the bridge for actuating the cutter when the impedance of the unwound portion reaches the desired value.

2. In a wire wound impedance element calibrator, means for progressively making electrical contact with wire being unwound from an overwound element to be calibrated, a two-speed driver for the electrical contacting means, means for controlling the speed of the driver, a cutter for clipping the impedance element wire being unwound, an impedance bridge having ratio impedances connected between a first terminal and a second and a third terminal, respectively, a standard impedance corresponding to the impedance to be calibrated connected between the third terminal and a fourth terminal and means for connecting the unwound portion of an element being calibrated between the second and fourth terminals, an auxiliary impedance for the bridge, means for initially connecting the auxiliary impedance in the bridge and for operating the two-speed driver at its higher speed, means responsive to a predetermined off-null condition of the bridge to reduce the speed of the driver to its lower speed and for removing the auxiliary impedance in the bridge to unbalance the bridge and means responsive to a recurrence of said off-null condition when the auxiliary impedance is removed from the bridge for actuating the cutter.

3. A calibrator according to claim 2 having adjustable impedance unbalancing means for the bridge for establishing said predetermined off-null condition when the impedance of an element being calibrated reaches the prescribed value and means for dynamically setting the adjustable means.

4. In a wire wound impedance element calibrator, the combination with first contacting means for making electrical contact with a first point along the wire of such an element, second contacting means for moving the wire and progressively making electrical contact therewith, and a cutter for clipping the moving wire, of a two-speed driver for the second contacting means, an impedance bridge, means for continuously including the wire between the two contacting means in one arm of the bridge, means for initially operating the driver at its higher speed, means responsive to a predetermined off-null condition of the bridge to reduce the speed of the driver to its lower speed, and means responsive to the output signal of the bridge for actuating the cutter when the impedance between the contacting means reaches a desired value.

5. A calibrator according to claim 4 having a variable impedance for unbalancing the bridge to said off-null condition as required for triggering the operation of the cutter, a motor for varying the setting of the variable resistance and means for energizing the motor to drive the impedance to a setting required to produce the prescribed off-null output of the bridge for the desired impedance to be calibrated.

6. In a wire wound impedance element calibrator, the combination with first contacting means for making electrical contact with a first point along the wire of such an element, second contacting means for moving the wire and progressively making electrical contact therewith and a cutter for clipping the moving wire, of a two-speed driver for the second contacting means, means for controlling the speed of the driver, an impedance bridge having means for connecting therein the portion of the element between the contacting means for comparing the impedances thereof with a standard, an auxiliary impedance for the bridge, means for initially connecting the auxiliary impedance in the bridge and for operating the two-speed driver at its higher speed, means responsive to a predetermined off-null condition of the bridge to reduce the speed of the driver to its lower speed and for removing the auxiliary impedance from the bridge to change its balance point, and means responsive to a recurrence of said off-null condition when the auxiliary impedance is removed from the bridge for actuating the cutter.

7. A calibrator according to claim 6 having a variable impedance for unbalancing the bridge to said off-null condition as required for triggering the operation of the cutter, and means for dynamically setting the variable impedance comprising a motor for varying the setting of the variable resistance and means for energizing the motor to drive the impedance to a setting required to produce the prescribed off-null output of the bridge for the desired impedance to be calibrated.

References Cited in the file of this patent

UNITED STATES PATENTS

| | | |
|---|---|---|
| 360,375 | Conant | Mar. 29, 1887 |
| 1,977,697 | Rockwood | Oct. 23, 1934 |
| 2,782,368 | McCarthy | Feb. 19, 1957 |